Aug. 8, 1933.   P. M. MILLER   1,921,475
WHEEL CONSTRUCTION
Filed July 3, 1929   2 Sheets-Sheet 1
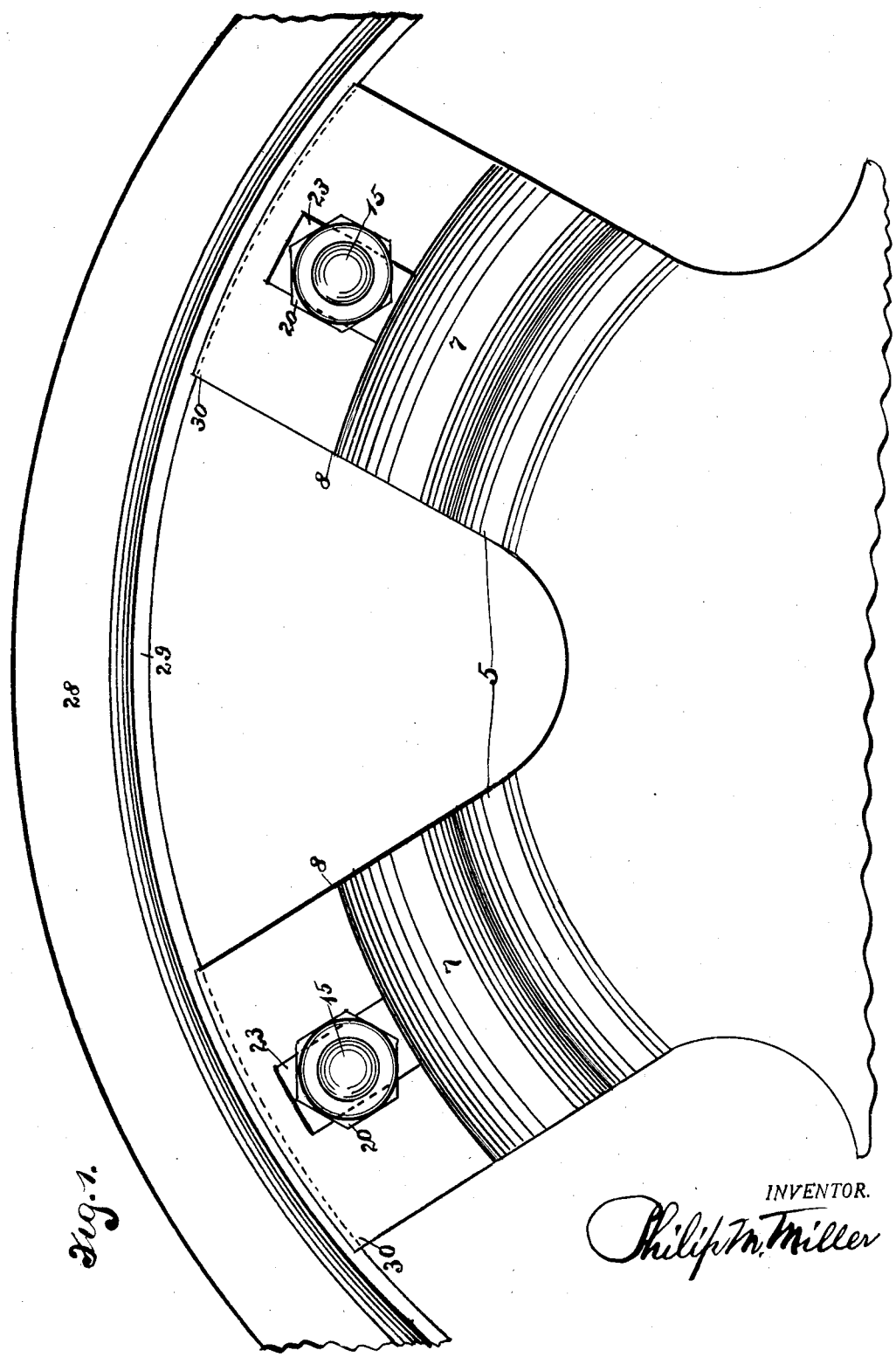
INVENTOR.
Philip M. Miller Aug. 8, 1933.     P. M. MILLER     1,921,475
WHEEL CONSTRUCTION
Filed July 3, 1929     2 Sheets-Sheet 2
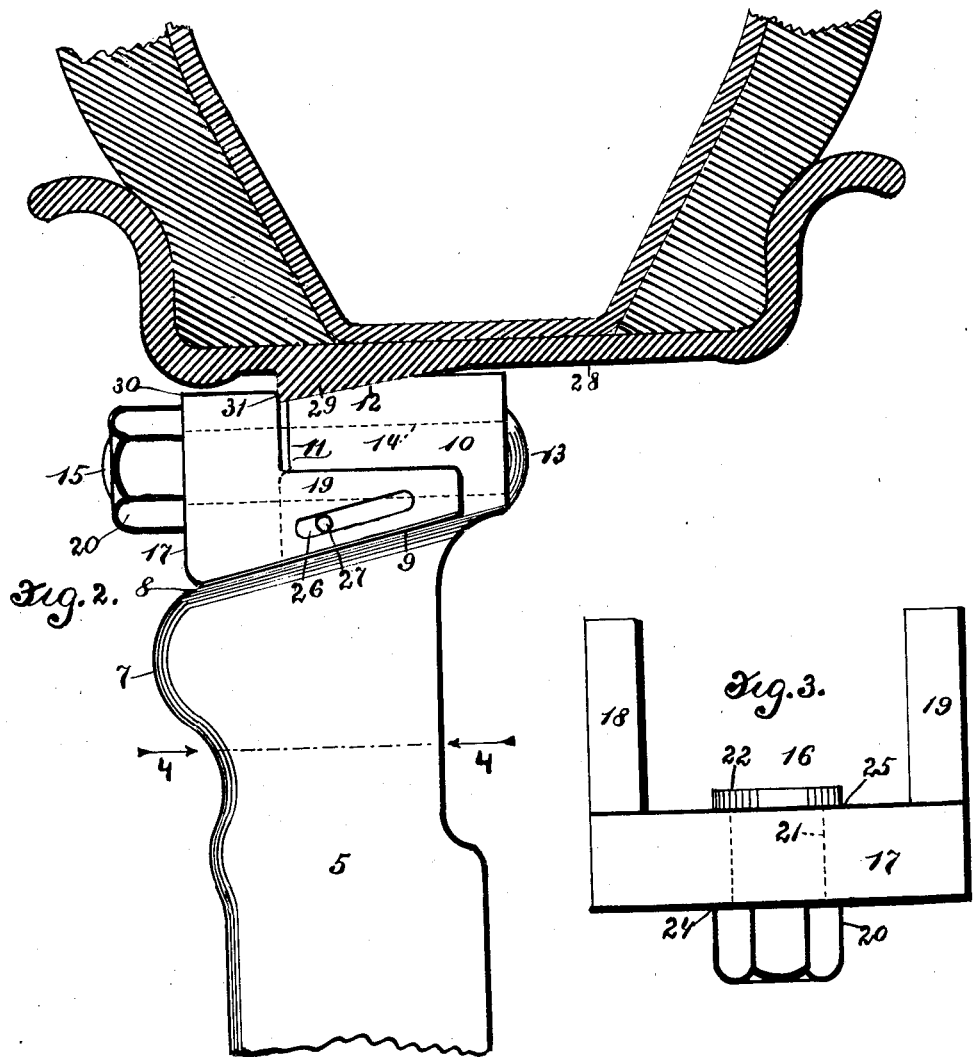
INVENTOR.
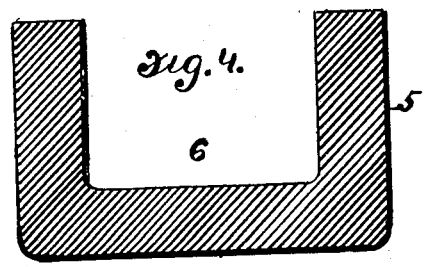

Patented Aug. 8, 1933

1,921,475

UNITED STATES PATENT OFFICE 1,921,475

WHEEL CONSTRUCTION

Philip M. Miller, Brooklyn, N. Y., assignor to Miller Devices Inc., New York, N. Y., a Corporation of New York Application July 3, 1929. Serial No. 375,726

3 Claims. (Cl. 301—12)

This invention relates to motor vehicle wheels in general and more particularly to wheels of the free-spoked spider type having a demountable tire-carrying rim mounted directly on the ends of the spokes.

The primary object of the invention is to provide, in conjunction with a free-spoked spider wheel, a rim-mount which is simple in construction, may be easily operated in mounting and demounting a tire rim, and is rugged and strong in service.

The subject matter of the present application is related to that disclosed in my co-pending application Serial No. 369,574, filed June 10, 1929.

With the above objects in view, means are provided in co-operative relation with the outer portion or head of each spoke for seating a movable U-shaped member adapted to wedge a demountable tire-carrying rim on the tapered bearing face of the respective heads thereof, the member being in embraced engagement with the sides of the head and held by projections in the sides thereof passing through slots formed in the side walls of the U-shaped member, for preventing accidental dislodgment of the U-shaped member and for sliding engagement of respective member on the side inclined seats of each spoke. The U-shaped member is provided with an operative thread member engaged in the slot of the wedging wall thereof and held in continual engagement between the walls of the slot thereof.

The nature and other objects of the invention will be better understood from the description of the particular illustrative embodiment thereof for the purpose of which description reference should be had to the accompanying drawings forming parts hereof and in which—

Fig. 1 is a side elevation of a fragment of a wheel and rim embodying the invention applied thereto;

Fig. 2 is a cross section thereof, the rim carrying a portion of a pneumatic tire;

Fig. 3 is a view of the U-shaped wedge member removed from one of the outer heads of the spokes to show its detail construction; and Fig. 4 is a cross section of Fig. 2 taken on the line 4—4 as indicated by the arrows.

The wheel construction preferably comprises a spider comprising spokes 5 radiating outwardly from the central or hub portion herein shown sectioned from the hub itself, each spoke being U-shaped in cross section, as indicated at 6, Fig. 4 which form or shape may vary in all details in order to provide a ribbed construction. The outer portion of each spoke is provided with a swell 7 formed in adjacence to the inclined seat 8 on each side thereof for the purpose of strengthening the outer portion of each spoke and forming a longitudinal line on each side incline 9. Integral with the side inclines 9 is an upright body having parallel walls 10 and a front face 11 forming the outer wall or side thereof extending to and integrally molding with the seat 8 in the manner such that a seat is formed on the front part of the spoke, together with a tapered bearing face 12 on the outer peripheral surface thereof. For the puropse of providing accessory locking means a bolt 13 is rigidly fixed in the body 10 passing therethrough outwardly as clearly shown at 14 and 15. In order to complete means for locking a demountable rim on the spokes, a U-shaped member generally indicated at 16 is provided with a front wall 17 comprising the wedge member, and opposite, parallel walls 18 and 19, shown in Fig. 3. The nut member 20 comprises a shank 21 and a rear collar 22. As clearly shown in Figs. 1 and 3, the shank 21 of the nut member 20 is freely engaged between the opposite walls of the slot 23 formed in the wedge member 17, while the opposite members 20 and 22 are in contact with the faces 24 and 25 of the wedge member 17, the members 20 and 22 being of a greater diameter with respect to the diameter of the shank 21, which means is for the purpose of engagement with the opposite faces thereof and prevention of dislodging the nut member from the slot therein. The nut member is provided with a threaded bore and is adapted for moving or sliding along the walls of the slot 23. To complete the wheel structure the assembled U-shaped locking member 16 is mounted on the side inclined seats 9 embracing by the side walls 18 and 19 the side walls 10 of the spoke head having wedge member 17 seating on the inclined front seat 8 facing the front wall 11 of the spoke head. The side walls 18 and 19 of member 16 are each provided with a slot 26 formed in the lower portion thereof on the line parallel with the inclined seats 9. A member 27 is fixed in each side 10 of the spoke head and outwardly projects through the slot for the purpose of inseparably holding the U-shaped member in position for a sliding engagement on the seats 9 and in relation to the opposite walls 10 of the spoke head. The nut member 20 is in threaded engagement with the extending threaded portion 15 of the bolt 13 which is rigidly fixed in the spoke head, when the U-shaped member 16 is moved outwardly on the inclined seats 9, and the nut member is disengaged with the bolt when the respective U-shaped member is moved downwardly on the inclined seats 9 with the side walls 18 and 19 on the bulged inclined seat 8. As is obvious, the movement of the U-shaped member 16 is controlled by the engagement and disengagement of the nut member 20 with the fixed bolt 13, the nut member always having an engagement with the front wall or wedge member 17, while the fixed pins 27 are the controlling means of preventing total dislodgment of the member from the head of the spoke. The U-shaped member forms movable means for inseparable engagement with the sides of each spoke to co-operate with the tapered face 12 of the head 10 for locking a demountable rim thereon.

As shown, the rim 28 carrying the tire with the tube is provided with a single bearing portion 29, the bearing face of which corresponds to the tapered bearing face 12 of the spoke end for a rigid engagement therebetween. The wedge member or wall 17 is formed with a rugged shoulder portion 30 whose inner edge 31 is in rigid engagement with the straight side of the bearing portion 29 of the rim, and the nut member 20 is in threaded engagement with the projected portion 15 of the bolt 13, thereby holding the side walls 18 and 19 of the member in wedged engagement with the inclined seats 8 and 9 in relation to the opposite walls 10 of the spoke. When the nut member 20 is disengaged from the bolt the U-shaped member is moved downwardly on the inclined seats 8 and 9 out of engagement to provide clearance for the removal of the rim; the U-shaped member being held against disengagement with the spoke end by the pins 27 and there is ample room to pass the inner periphery of the bearing of the rim; and when the operation is reversed the rim is locked on the wheel.

It is understood that the embodiments of the invention set forth herein, are only of the many embodiments the invention may take, and I do not wish to be limited in the practice of my invention nor in my claims to the particular embodiments set forth.

What I claim is:

1. In a wheel for motor vehicles, the combination with a rim, of a spider construction having a free spoke end formed with inclined bearing faces, a locking bolt extending through and projecting from said spoke end, a rim-clamping device for the spoke end adapted to be engaged by said bolt for locking the rim on said end, said device being formed with inclined bearing faces adapted to seat on the bearing faces of the spoke end and slotted side portions which straddle said end, and pins fixed in the end of said spoke and projecting into the slots formed in said side portions.

2. In a wheel, a spider construction having free spoke ends formed with inclined bearing faces for rim-clamping members, locking bolts extending through and normally held in association with said spoke ends, and clamp members for said spoke ends, each of said clamp members having slotted side portions adapted to seat and have bearing on the inclined faces of the respective spoke end to which it may be applied, means fixed in the spoke end and passing through the said slotted side portions to always maintain the clamp member in operative association with respect to the spoke end, the said clamp member being adapted to engage one of the locking bolts for moving said member into and from locking engagement with respect to a demountable rim.

3. In a wheel for motor vehicles, a spider construction having free spoke ends formed with rim-bearing projections, each of said projections being formed with an inclined bearing face for a tire rim and the spoke end being formed with inclined bearing faces for a rim-clamping device at the base of said projection, rim-clamping devices adapted to seat on said bearing surfaces and formed with slotted side portions adapted to straddle said rim-bearing projections, means extending through the slots of said side portions for inseparably maintaining said devices in operative association with the spoke ends, said devices being provided with rotatable locking elements adapted to engage locking bolts and move the rim into locking and unlocking engagement on the rim-bearing projections.

PHILIP M. MILLER.